2,853,531

1,2-DIFLUORO-1,2-DIALKOXYETHYLENES AND PREPARATION THEREOF

Charles S. Cleaver, Wilmington, Del., assignor to E. I. du Pont de Nemours and Company, Wilmington, Del., a corporation of Delaware No Drawing. Application April 26, 1956
Serial No. 580,715

8 Claims. (Cl. 260—615)

This invention relates to new fluorine-containing unsaturated compounds, and is more particularly concerned with 1,2-difluoro-1,2-dialkoxyethylenes where the carbon atom attached to the oxygen in each alkoxy group bears at most one hydrogen atom, i. e., is secondary or tertiary, and with the preparation of these compounds.

It is an object of this invention to provide new polymerizable fluorine-containing unsaturated compounds of utility in the preparation of polymers of decreased flammability. Another object is to provide a method for preparing these compounds from chlorodifluoromethane. Other objects will become apparent from the specification and claims.

In accordance with this invention it has been found that products represented by the general formula

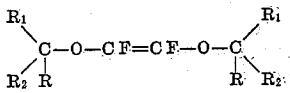

wherein R is hydrogen or alkyl and $R_1$ and $R_2$ are alkyl groups, are prepared by a process which comprises reacting chlorodifluoromethane with an alkali metal alkoxide of a secondary or tertiary alkanol, i. e., an alkanol of the formula

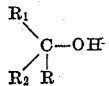

where the R's are as defined above. The reaction may be represented by the overall equation:

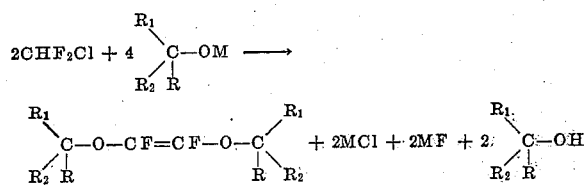

where M represents an alkali metal and the R's have the previously stated significance.

It is of interest that chlorodifluoromethane is unique in its ability to yield the 1,2-difluoro-1,2-dialkoxyethylenes. In the course of the work leading to this invention, it was determined that such closely related compounds as dichlorodifluoromethane and trifluoromethane failed to react with alkoxides of the type defined above. Furthermore, chloroform and potassium tert-butoxide react in a completely different manner, yielding 1,1-dichloro-2,2-dimethylcyclopropane. It is also noteworthy that, when an alkoxide of a primary alcohol (rather than a secondary or tertiary alcohol) is reacted with chlorodifluoromethane, the reaction product is not an unsaturated fluoroether but an alkyl orthoformate. Moreover, reaction between chlorodifluoromethane and thiols, e. g., n-$C_4H_9SH$ or $C_6H_5SH$, proceeds differently in that the corresponding difluoromethyl sulfide is produced, e. g., n—$C_4H_9$—S—$CF_2H$ and $C_6H_5$—S—$CF_2H$ in the above cases. Thus, the process of this invention is unexpectedly specific to the above-defined reactants.

The reaction is preferably carried out by passing gaseous chlorodifluoromethane through a solution of an alkali metal (preferably sodium or potassium) in a secondary or tertiary alkanol, such a solution containing the metal in the form of an alkoxide. The reaction is exothermic and starts readily at room or lower temperature, e. g., 0° C., the temperature being preferably maintained below about 80° C., by means of external cooling. The reaction is finished when there is no longer any appreciable heat evolution. The relative proportions of the two reactants (alkali metal alkoxide and chlorodifluoromethane) are not critical, since one or the other can be used in excess, if desired. The concentration of the alkali metal alkoxide in the alkanol is not critical either, as long as the mixture retains practical fluidity at the operating temperature. If desired, an inert diluent, preferably a hydrocarbon such as hexane or cyclohexane, may be added to the reaction mixture to increase its fluidity and to act as solvent for the organic reaction products in the subsequent work-up.

The reaction products are isolated by extracting the reaction mixture repeatedly with water to remove the inorganic salts and to destroy any unreacted alkali metal alkoxide, and fractionating the organic layer.

The following examples illustrate specific embodiments of the invention:

Example I 1,2-difluoro-1,2-di(tert.-butoxy)ethylene, as a mixture of cis and trans isomers, was prepared as follows: A solution of potassium tert.-butoxide in tert.-butyl alcohol was formed by adding gradually 228 g. (5.8 g. atoms) of metallic potassium to 3 liters (about 32 moles) of tert.-butyl alcohol. Toward the end of the reaction, 500 cc. of n-hexane was added to the mixture, which was then cooled to 30° C. Gaseous chlorodifluoromethane was passed through the reaction mixture, which was warmed to approximately 50–60° C. by the exothermic reaction and was maintained at this temperature by intermittent cooling. After about 1.5 hours, heat evolution decreased, and addition of the chlorodifluoromethane was stopped. The reaction mixture was then extracted several times with approximately 1-liter portions of water. The remaining organic layer was dried over anhydrous magnesium sulfate, and the tert.-butyl alcohol and n-hexane were removed from it by flash distillation. Distillation of the remainder, taking care not to exceed a still temperature of about 90° C., gave about 25% yield of a liquid boiling in the range of 55–65° C. at 10 mm. pressure and having a refractive index $n_D{}^{25}$ 1.4038–1.4022. Compositional analysis, infrared analysis and nuclear magnetic resonance analysis were all consistent with the structure of 1,2-difluoro-1,2-di(tert.-butoxy)ethylene,

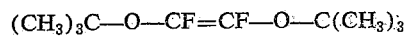

for this product, and this structure was moreover confirmed by its Raman spectrum which indicated the presence of a double bond. The product could be fractioned into two portions, B. P. 57–61.5° C. at 11 mm. and 60.5–61.5° C. at 10–11 mm., which were identical in all analyses and were therefore taken to be the cis and trans isomers of 1,2-difluoro-1,2-di(tert.-butoxy)ethylene.

This compound is best stored at temperatures of 0° C. or less to prevent decomposition. It is quite stable toward concentrated ammonium hydroxide and sodium hydroxide and toward dilute aqueous acids. However, traces of concentrated sulfuric acid cause vigorous decomposition with formation of a gas and of a resinous material. 1,2 - difluoro-1,2-di(tert.-butoxy)-ethylene absorbs bromine in carbon tetrachloride rapidly. This absorption is followed immediately by gas evolution and tar formation.

Example II 1,2-difluoro-1,2-di(isopropoxy)ethylene was prepared as follows: A slurry of potassium isopropoxide in isopropyl alcohol was formed by adding gradually 80 g. of metallic potassium to 500 cc. of isopropyl alcohol. To the slurry was then added 500 cc. of cyclohexane. Chlorodifluoromethane was slowly bubbled through the reaction mixture for a period of one hour. The reaction was exothermic and cooling was necessary to keep the temperature at 40–50° C. When the end of heat evolution indicated that the reaction was completed, the mixture was extracted several times with water to remove the inorganic salts. The aqueous solution was extracted with ether, and the ether extract was added to the organic layer previously separated. The organic solution was dried and distilled. There was obtained a small amount of a distillate boiling at 58–65° C. at 40 mm., which was identified by its nuclear magnetic resonance spectrum as a mixture of cis and trans 1,2-difluoro-1,2-di(isopropoxy)ethylene,

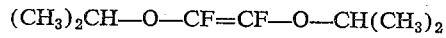

$(CH_3)_2CH—O—CF=CF—O—CH(CH_3)_2$

The majority of the reaction product was isopropyl orthoformate, $HC[O—CH(CH_3)_2]_3$, B. P. 78–84° C. at 40 mm., $n_D^{25}$ 1.3942. The chemical properties of 1,2-difluoro-1,2-di(isopropoxy)ethylene are similar to those of 1,2-difluoro-1,2-di(tert.-butoxy)ethylene.

While this invention has been illustrated with reference to certain specific compounds, it broadly includes as new products the 1,2-difluoro-1,2-dialkoxyethylenes where the carbon atom attached to the oxygen in each alkoxy group is secondary or tertiary. These new ethers are obtainable by the reaction of chlorodifluoromethane with an alkali metal alkoxide of the formula

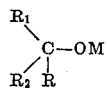

where M represents an alkali metal, R is hydrogen or alkyl and $R_1$ and $R_2$ are alkyl groups. Preferably, the alkoxide is that of an alcohol having a total of not more than ten carbon atoms.

Thus, by the method of the above examples, 1,2-difluoro-1,2-di(sec.-butoxy)ethylene is prepared from sec.-butyl alcohol; 1,2-difluoro-1,2(2-pentoxy)-ethylene from 2 - pentanol; 1,2 - difluoro - 1,2-di-[(2-methyl)-2-butoxy]-ethylene from 2-methylbutanol-2; 1,2-difluoro-1,2-[(3-methyl) - 3 - pentoxy]ethylene from 3-methylpentanol-2; 1,2 - difluoro-1,2[(2,3-dimethyl)-2-butoxy]ethylene from 2,3-dimethylbutanol-3; 1,2-difluoro-1,2[(2,4-dimethyl)-3-pentoxy]ethylene from 2,4-dimethylpentanol-3; 1,2-difluoro-1,2-[(2,3,3-trimethyl)-2-butoxy]ethylene from 2,3,3 - trimethylbutanol-2; 1,2-difluoro-1,2-di(2-octoxy)ethylene from octanol-2; 1,2-difluoro-1,2-[(2,3,3-trimethyl)-2-pentoxy]ethylene from 2,3,3-trimethylpentanol-2; 1,2-difluoro - 1,2-[(3-ethyl-6-methyl)-3-heptoxy]ethylene from 3-ethyl-6-methylheptanol-3; and the like.

The reaction proceeds better with alkoxides of tertiary alcohols, and these are therefore preferred as starting materials. Since the most accessible alcohols of this type are those having not more than ten carbon atoms, the most useful starting materials are the alkoxides of tertiary alkanols of four to ten carbon atoms, and the preferred reaction products are the 1,2-difluoro-1,2-di-(tert.-alkoxy)ethylenes where the alkoxy groups have from four to ten carbon atoms.

Alkoxides of primary alcohols are inoperable for the purpose of this invention, since an entirely different reaction takes place in which the halogens of the chlorodifluoromethane are replaced by primary alkoxy groups to give an alkyl orthoformate, as shown by the following experiments:

A solution of sodium ethoxide was formed by adding 23 g. (one gram-atom) of metallic sodium to about 350 cc. of absolute ethanol. Chlorodifluoromethane was bubbled through this solution with stirring, while the temperature was maintained below 60° C. by cooling. After the heat evolution had ceased, the white precipitate which had formed was separated by filtration. This solid (48 g.) was water-soluble and gave positive tests for both the chlorine and fluorine ions. The filtrate was distilled at atmospheric pressure, giving 340 cc. of ethanol (B. P. 76–77° C.), a very small fraction (3 cc.) between 77 and 142° C., and 21 cc. of reaction product boiling at 142–145° C. (nearly all at 145° C.) and having refractive index $n_D^{25}$ 1.3889. This material, which was the sole organic reaction product, was ethyl orthoformate (B. P. 145–146° C.; $n_D^{25}$ 1.3900).

To a solution of 60 g. of sodium in 500 g. of absolute ethanol was added 500 cc. of hexane as diluent. This mixture was chilled to —55° C. and treated with chlorodifluoromethane. There was no apparent reaction at that temperature. The mixture was then allowed to warm slowly and reaction began at about —20° C., as shown by the appearance of a white precipitate. After passing chlorodifluoromethane through the mixture for one-half hour at a temperature between —20 and —5° C., the mixture was diluted with 300 cc. of water. The organic layer was washed twice with 250 cc. portions of water, dried and distilled at 45 mm. pressure. All fractions of the distillate were tested for fluorine, and all were negative. The sole organic reaction product was 25 cc. of ethyl orthoformate.

The products of this invention polymerize in the same way as vinylidene halides with conventional catalysts to give fluorine-containing homopolymers and copolymers. These polymers are useful for imparting decreased flammability to shaped plastic articles such as films, sheets, coating compositions, molded products, etc. For example, the 1,2-difluoro-1,2 dialkoxyethylenes of this invention can be polymerized per se in the presence of ionic catalysts such as ferric chloride or free radical-producing initiators such as peroxides or, preferably, low temperature initiators such as azonitriles. They can also be copolymerized in the same way with vinylidene monomers such as vinyl halides, vinyl esters, styrene, 1,3-butadiene, etc.

A further advantage of the fluoroethers of this invention is that they dissolve polyvinyl fluoride, which is not soluble in common solvents. Such solutions are valuable coating and impregnating compositions for use in depositing polyvinyl fluoride on substrates such as metals or textiles.

Since many different embodiments of the invention may be made without departing from the spirit and scope thereof, it is to be understood that the invention is not limited by the specific illustrations except to the extent defined in the following claims.

What is claimed is:

1. 1,2-difluoro-1,2-dialkoxyethylene wherein each alkoxyl group has at most ten carbon atoms and the carbon atom attached to the oxygen in each alkoxy group bears at most one hydrogen atom.

2. 1,2-difluoro-1,2-dialkoxyethylene wherein each alkoxy group is the residue of a secondary alcohol having a total of up to 10 carbon atoms.

3. 1,2-difluoro-1,2-dialkoxyethylene wherein each alkoxy group is the residue of a tertiary alcohol having a total of up to 10 carbon atoms.

4. The process which comprises reacting chlorodifluoromethane with a solution in the alcohol from which it is derived of an alkali metal alkoxide of the formula

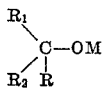

wherein R is selected from the group consisting of hydrogen and alkyl groups, $R_1$ and $R_2$ are alkyl groups and M is an alkali metal, said alkoxide having a total of up to ten carbon atoms, and isolating the 1,2-difluoro-1,2-dialkoxyethylene formed.

5. The process which comprises reacting chlorodifluoromethane with a solution in the alcohol from which it is derived of an alkali metal alkoxide of a secondary alcohol having a total of up to 10 carbon atoms and isolating the 1,2-difluoro-1,2-dialkoxy ethylene formed.

6. The process which comprises reacting chlorodifluoromethane with a solution in the alcohol from which it is derived of an alkali metal alkoxide of a tertiary alcohol having a total of up to 10 carbon atoms and isolating the 1,2-difluoro-1,2-dialkoxy ethylene formed.

7. The process which comprises passing gaseous chlorodifluoromethane through a solution of an alkali metal in a secondary alkanol of up to ten carbon atoms at a temperature below about 80° C. and isolating the 1,2-difluoro-1,2-di(sec.-alkoxy)ethylene formed.

8. The process which comprises passing gaseous chlorodifluoromethane through a solution of an alkali metal in a tertiary alkanol of four to ten carbon atoms at a temperature below about 80° C. and isolating the 1,2-difluoro-1,2-di(tert.-alkoxy)ethylene formed.

References Cited in the file of this patent

UNITED STATES PATENTS 2,737,530    Ruh ------------------ Mar. 6, 1956

OTHER REFERENCES

Sah et al.: Jour. Amer. Chem. Soc., vol. 54 (1932), pp. 2964–2966.

Park et al.: Ind. and Eng. Chem., vol. 39, No. 3 (1947), pp. 354–358.

Haszeldine et al.: Fluorine and its Compounds (1951), p. 109.

Wagner and Zook: Synthetic Org. Chem. (1953), pp. 232, 543.